United States Patent [19]

Bergmann

[11] Patent Number: 5,032,992
[45] Date of Patent: Jul. 16, 1991

[54] ELECTRONIC TEMPERATURE CONTROL SYSTEM

[75] Inventor: Konrad Bergmann, Wittlich, Fed. Rep. of Germany

[73] Assignee: American Standard Inc., New York, N.Y.

[21] Appl. No.: 262,567

[22] Filed: Oct. 24, 1988

Related U.S. Application Data

[63] Continuation-in-part of Ser. No. 076,233, Jul. 16, 1987, abandoned.

[30] Foreign Application Priority Data

Jul. 23, 1986 [DE] Fed. Rep. of Germany ....... 3624799

[51] Int. Cl.$^5$ .......................... G06F 15/46; G01F 1/00
[52] U.S. Cl. ............................. 364/550; 137/624.12; 236/12.12; 364/510; 364/509
[58] Field of Search ............... 364/509, 510, 502, 557, 364/558; 137/561 R, 624.12, 624.11; 236/12.1, 12.11, 12.12, 12.15

[56] References Cited

U.S. PATENT DOCUMENTS

| | | | |
|---|---|---|---|
| 4,420,811 | 12/1983 | Tarnay et al. | 364/510 |
| 4,581,707 | 4/1986 | Millar | 364/510 |
| 4,682,728 | 7/1987 | Oudenhoven et al. | 364/510 |
| 4,696,428 | 9/1987 | Shakalis | 137/607 |
| 4,720,807 | 1/1988 | Ferran et al. | 364/510 |
| 4,725,964 | 2/1988 | Lloyd et al. | 364/510 |
| 4,739,923 | 4/1988 | Tsutsui | 364/510 |
| 4,774,978 | 10/1988 | Lepine, Jr. et al. | 137/607 |
| 4,854,498 | 8/1989 | Stayton | 364/502 |
| 4,867,375 | 9/1989 | Ueki et al. | 364/502 |
| 4,875,623 | 10/1989 | Garris | 364/510 |

Primary Examiner—Kevin J. Teska
Attorney, Agent, or Firm—Blum Kaplan

[57] ABSTRACT

An electronic temperature control method and apparatus unit for a mixing valve for plumbing fixtures. The loop gain in the control unit is at least approximately inversely proportional to the instantaneous slope of the characteristic curve of the mixing valve, and the slope of the characteristic curve is determined from the instantaneous conditions of valve opening, hot and cold supply temperatures and mix temperatures.

5 Claims, 4 Drawing Sheets

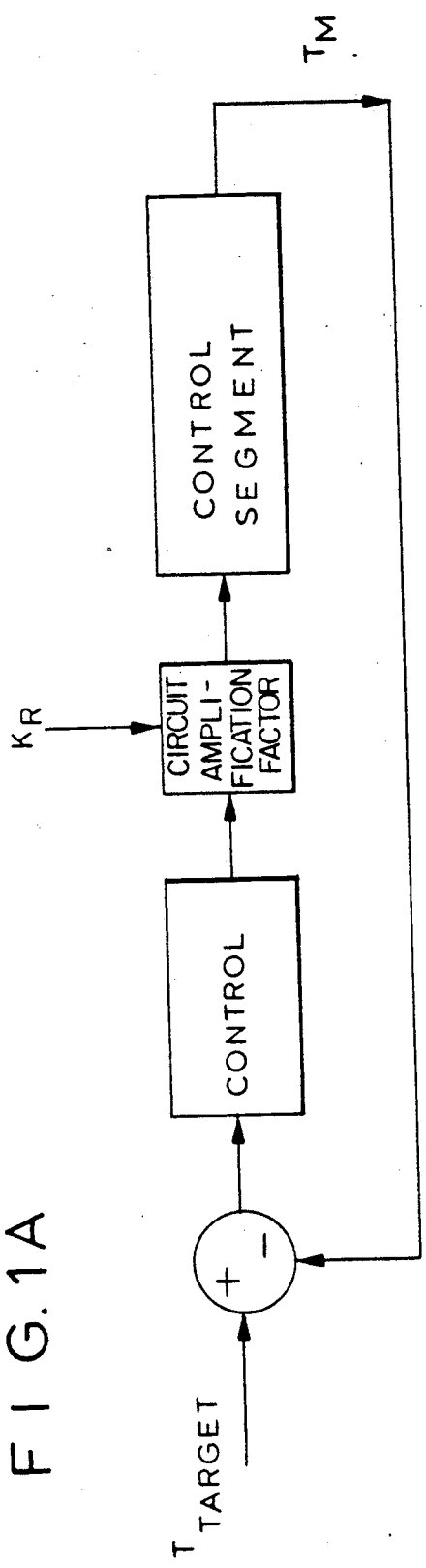
F I G. 1A
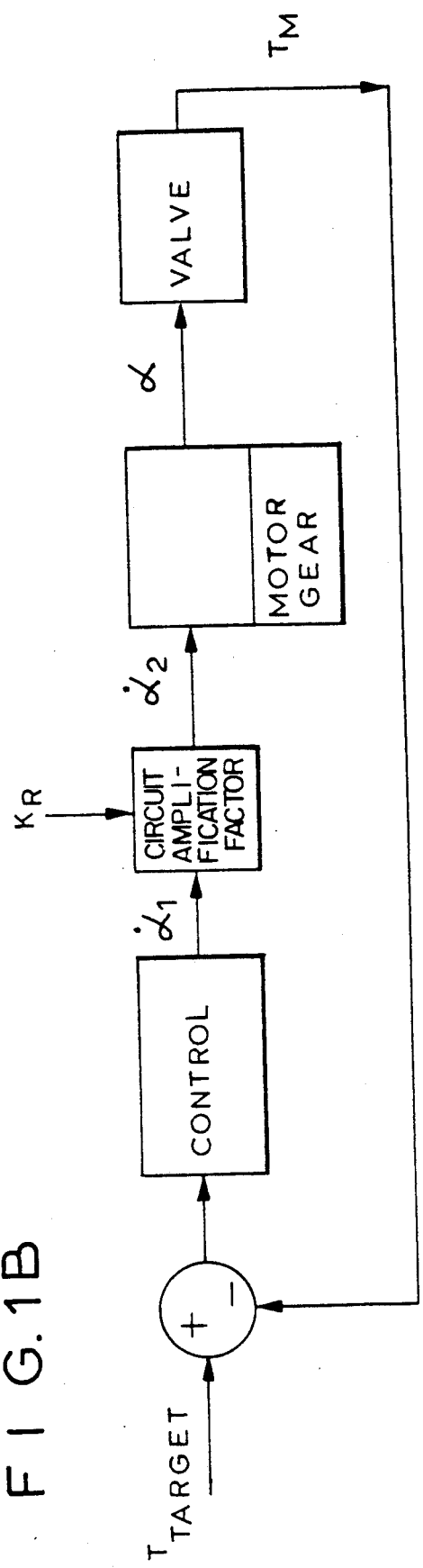
F I G. 1B

ELECTRONIC TEMPERATURE CONTROL SYSTEM

This is a continuation-in-part of application Ser. No. 076,233, filed July 16 1987, now abandoned.

BACKGROUND OF THE INVENTION

1. FIELD OF THE INVENTION

The invention relates to an electronic temperature control unit for a mixing valve, especially for plumbing fixtures in which hot and cold water are mixed together.

2. DESCRIPTION OF PRIOR ART

Electronic control of mixing valves is disclosed, for example, in German Letters of Disclosure Nos. 2,836,698, 3,030,716, 3,146,501, 3,407,796, 3,425,445, 3,430,176 and U.S. Pat. No. 4,420,881. The temperature setting made manually with a conventional mixing valve is intended to be accomplished with rapidity and precision by electronic means, and to be maintained even where changes in supply pressure and temperatures occur.

As in the case of a manually actuated mixing valve, various mixing systems may be employed, for example, separate valves for mixing hot and cold water, or piston or disk type valves in which the controls for hot and cold water are combined in a single actuating unit.

The object of establishing and maintaining a certain outlet temperature is achieved by means of a regulator, which may comprise proportional, integral or differential (P, I, D) components or combinations thereof.

A disadvantage of known control systems is that the loop gain (control circuit amplification) used must be small, and hence the outlet temperature of the mixing valve cannot be corrected quickly enough to achieve stable operation of the control system in all operating conditions, with supply pressures and temperatures differing within wide limits. Unstable operating conditions arise, for example, when the valve is wide open but is sharply throttled by an outlet resistance such as a shower head or a clogged aerator, which results in simultaneous differences in supply pressures between hot and cold water.

An improvement in the proportional component of the regulation is obtainable by measuring pressure perturbations in order to compensate for them. With exact measurement and reproducible properties of the valves used, the valve settings can in principle be so determined that the outlet temperature is maintained, unaffected by the perturbations.

Direct measurement of the supply pressures requires complex and expensive sensors and is best avoided; however German Letter of Disclosure No. 3,407,796 shows how the pressure perturbations $\Delta p_H$, $\Delta p_C$ can be calculated from the cold, hot and mix temperatures $T_C$, $T_H$, $T_M$ and the valve opening settings. It is an advantageous feature that the pressure measurement can be reduced to temperature measurement and displacement or angular measurement (i.e. valve opening). It is a disadvantage in this procedure that the pressure variations, in themselves rapid, must be sensed and evaluated with a delay due to the time lags of the temperature sensors and an additional time lag for calculating the pressure ratio. A further disadvantage is that calculated valve settings, owing to unavoidable errors of measurement and irregularities of the valves, especially after some time in service, will not result in the exact target temperatures, thus leaving a residual temperature error to be compensated by an additional I-control which, in turn, will function comparatively slowly for the reasons given above.

SUMMARY OF THE INVENTION

The object of the invention is to eliminate these disadvantages and provide an electronic temperature control unit for a mixing valve unit in which the suppression of transient changes in the temperature of the mixed water can be effected independently of the supply conditions, pressures and temperatures and independently of outlet resistances.

This object is accomplished essentially in that the loop gain of the control unit is made at least approximately inversely proportional to the instantaneous slope of the characteristic ($T_M$, $\alpha$) curve of the mixing valve unit, the slope of the characteristic curve being determined from the instantaneous conditions at the unit.

According to another object of the invention, the control system employs a control signal with I-behaviour, that is, the control unit issues speed instructions to servo elements of the mixing valve unit whose integral is proportional to the valve setting.

In the present invention, the transient behavior of the control unit becomes optimizable because the quantities affecting the time behavior of the control system are continually measured and monitored to control the loop gain, thus achieving an adaptation to the dynamic behavior of the control unit at any given time. The behavior of the control unit is similar in practice to, for example, the behavior of the user of a manually-operable single-lever mixer fitting. The user must ascertain by trial and error the temperature change resulting from a given amount of turning of the lever (valve opening setting) and then can adjust the valve opening setting accordingly to maintain a desired mix temperature. He too, in other words, must adapt to the instantaneous properties of the mixing valve.

BRIEF DESCRIPTION OF THE DRAWINGS

The drawings illustrate embodiments, by way of example, of the present invention.

FIG. 1A shows a control unit or system of a general type with loop gain $K_R$, made adaptive to the instantaneous mixing valve conditions in accordance with the present invention;

FIG. 1B shows a control system in which the control issues velocity or angular velocity signals $\alpha$, which are integrated by a motor gear unit of the mixing valve to generate valve opening settings $\alpha$;

Figure 2:
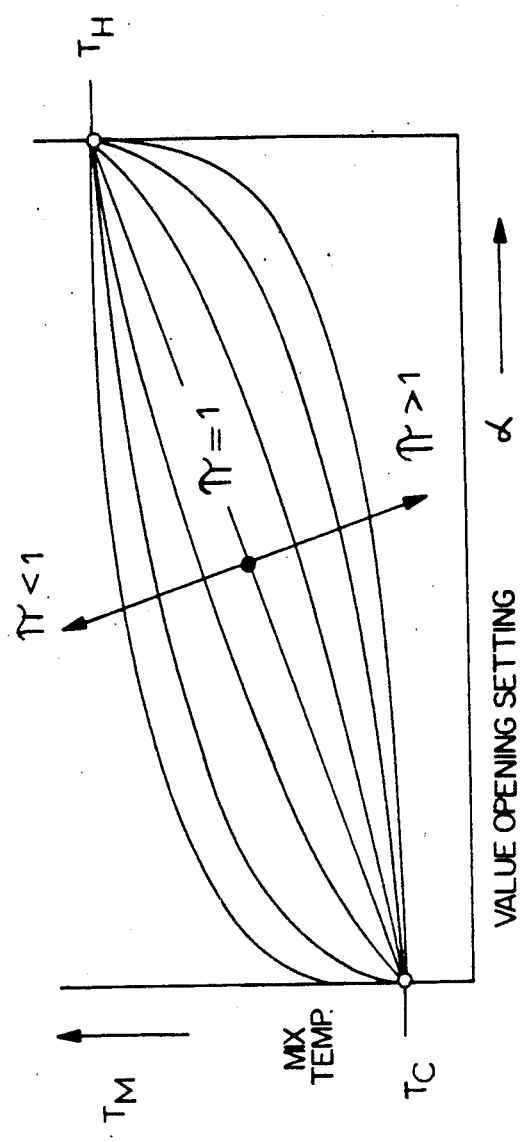
FIG. 2 is a graph of mixed water temperature $T_M$ as a function of valve opening setting $\alpha$, for a range of pressure ratios $$\pi \left( \pi = \frac{\Delta p_C}{\Delta p_H} \right);$$

The present invention relates to electronic control of a mixing valve for regulating the temperature of water from an outlet to a desired temperature. The outlet or mix temperature $T_M$ is adjusted by varying the setting angle $\alpha$ of at least one mixing valve, the or each valve controlling the relative amounts of hot and cold water supplied to the outlet. The relationship of the mix temperature $T_M$ to the setting angle $\alpha$ gives a characteristic curve ($T_M$, $\alpha$) of the mixing valve, and this characteristic curve varies in shape according to the ratio $\pi$ of the pressures $\Delta P_C$, $\Delta P_H$ of the hot and cold supplies, as illustrated in FIG. 2.

Figure 1C:
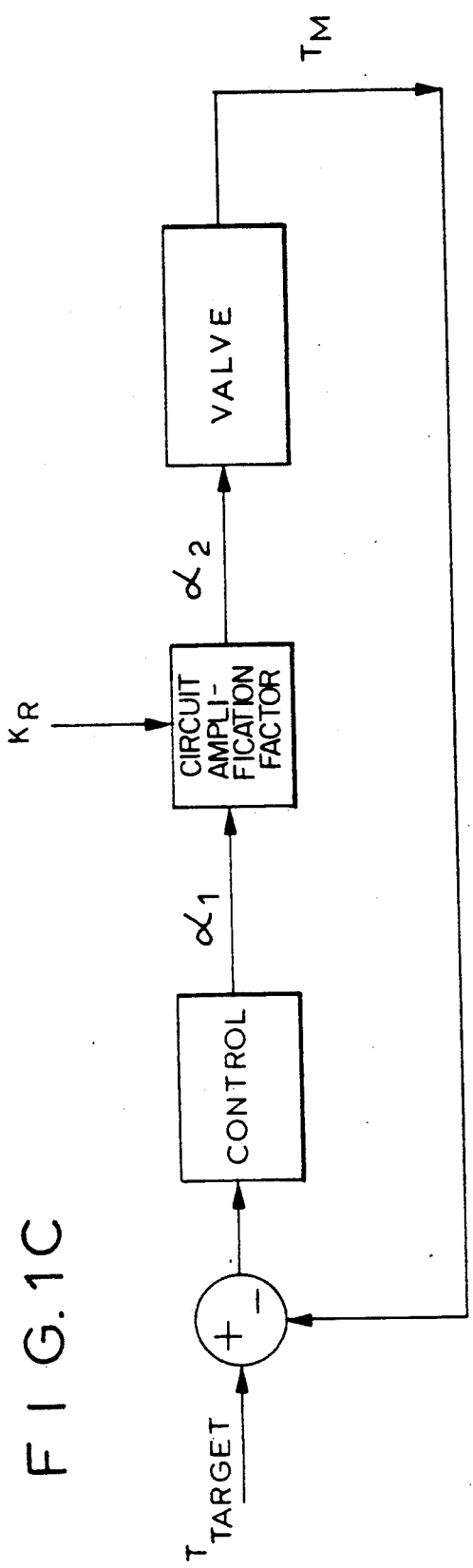
FIG. 1C shows a control system in which the control issues valve opening settings $\alpha$ directly.

Referring to FIGS. 1A to 1C, in the control system for regulating the mix temperature $T_M$, the mix temperature is compared with a target (desired) temperature T TARGET and the difference is fed to a control to produce a first control signal.

This control signal is then multiplied by a loop gain (circuit amplification factor) $K_R$, to produce a second control signal which is fed to a motor (servo element) for driving the mixing valve. The second control signal may represent a setting angle $\alpha$ directly (e.g. FIG. 1C), or it may represent an angular velocity $\dot{\alpha}$, which produces a setting angle $\alpha$ when fed to a motor gear having an integrating characteristic (e.g. FIG. 1B). The loop gain $K_R$ is used, together with the control, in converting the temperature difference (the difference between the measured temperature $T_M$ and the target temperature) into a valve setting angle $\alpha$ (or angular velocity $\dot{\alpha}$).

FIG. 1B is an example of integral, I, behavior of the control signal and FIG. 1C an example of proportional, P, behavior. In general the control may comprise Proportional, Integral, Derivative (P, I, D) components or exhibit other special features. The invention may be applied to individual P, I or D components of the control only.

In practice, the control system will normally be implemented using digital electronic circuitry, e.g. a microprocessor system, operating in discrete time steps under control of a clock. In this case, the size of the loop gain $K_R$ in effect determines how large a change in valve setting angle is made at one time step in response to a given size of detected temperature difference.

In the present invention, the loop gain $K_R$ is adaptive, that is, it is altered dependent on the operating conditions of the mixing valve.

One reason for making the loop gain adaptive can be seen from FIG. 2. When the ratio $\pi$ of pressures of the hot and cold supplies equals 1, the relationship of $T_M$ to $\alpha$ is linear; a given change in $\alpha$ will always produce the same change in $T_M$ and so a constant value of $K_R$ is appropriate. When, however, the pressure at one inlet is greater than at the other, i.e. $\pi < 1$, the relationship of $T_M$ to $\alpha$ is nonlinear. For example, at a large setting angle $\alpha$, for $\pi > 1$, a given temperature change is produced by only a small change in the setting angle $\alpha$.

Conversely, at a small value of $\alpha$, for $\pi > 1$, a given temperature change requires a large change in $\alpha$, and so a larger value of $K_R$ is appropriate.

Figure 3:
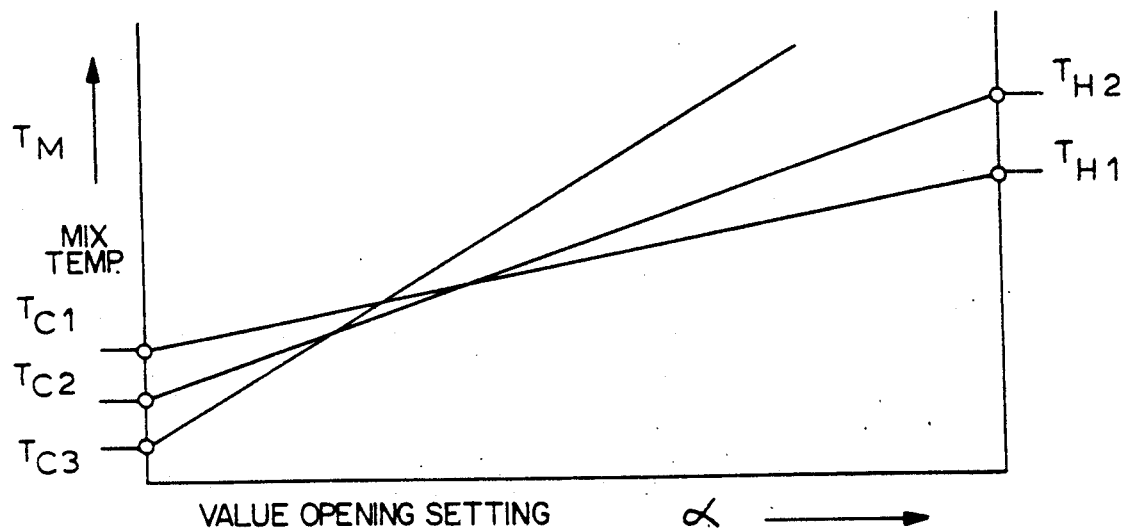
FIG. 3 is a graph of mixed water temperature $T_M$ as a function of valve opening setting $\alpha$, for different combinations of hot and cold supply temperatures ($T_H$, $T_C$)
Figure 4:
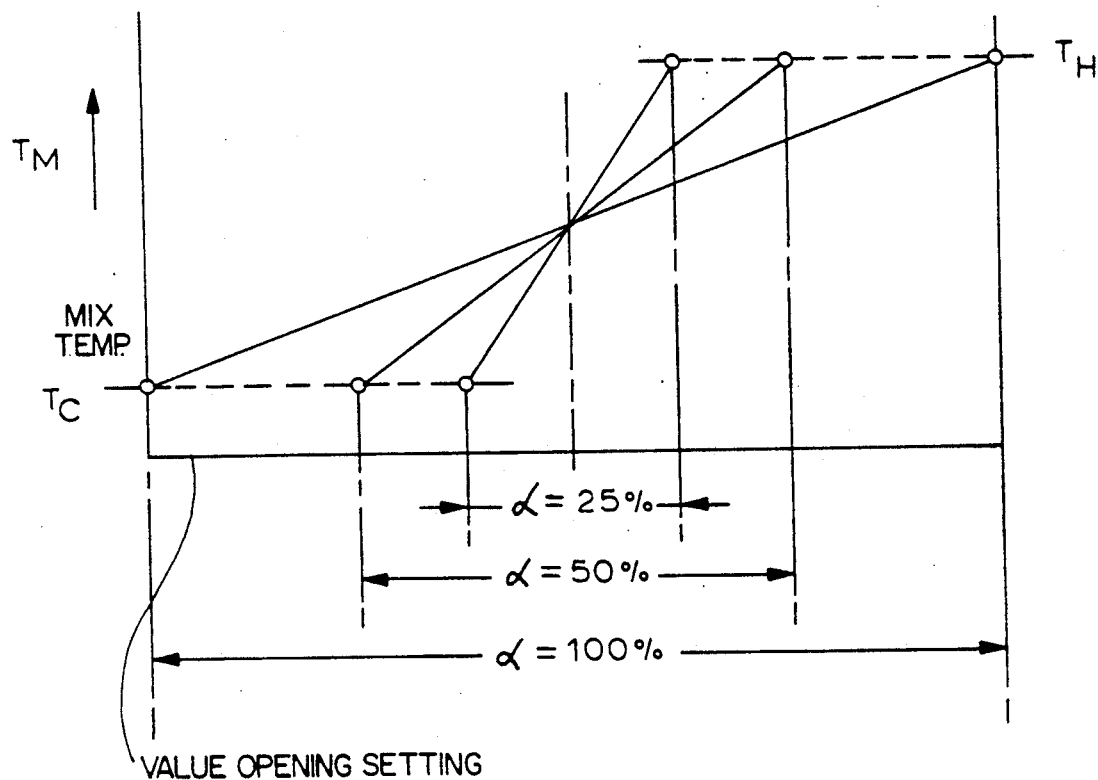
FIG. 4 is a graph of mixed water temperature $T_M$ as a function of valve opening setting $\alpha$, showing the effect of different angular ranges of the valve opening setting.

A measure of the non-linearity of the ($T_M$, $\alpha$) relationship is the slope of the characteristic curve. In the above-mentioned case of a large setting angle and $\pi > 1$, the slope is steep and a small value of $K_R$ is required in order to correct a given temperature difference. On the other hand, for small $\alpha$ and $\pi > 1$, the slope is shallow and a large value of $K_R$ is required. FIG. 2 shows the effect of pressure changes alone on the characteristic curve; however, similarly, $K_R$ should desirably be varied to take account of the effects of supply temperatures and valve opening ranges too, as shown in FIGS. 3 and 4. The invention utilises the idea of determining $K_R$ on the basis of the inverse of the slope of the overall characteristic curve which results from all these effects together.

There now follows an explanation of methods by which an appropriate instantaneous value of $K_R$ can be determined.

FIGS. 2 to 4 illustrate the dependence of the characteristic ($T_M$, $\alpha$) curve of the mixing valve upon various parameters: the pressure ratio $\pi$—FIG. 2; the hot and cold supply temperatures $T_H$ and $T_C$—FIG. 3; and the range of valve opening settings $\alpha$—FIG. 4.

In other words, there are three independent effects on the mix temperature to which the loop gain $K_R$ should be made responsive in order accurately to maintain a desired mix temperature. These effects can be considered separately by defining three parameters $K_P$, $K_T$, $K_\alpha$ representing adaptation to the effects of pressure, temperature, and valve opening respectively, where:

$$K_R = K_P K_T K_\alpha$$

It will be apparent that $K_T$ and $K_\alpha$ can be determined relatively easily, in the latter case by monitoring the amount of valve opening and in the former case by means of temperature sensors placed in inlets for the hot and cold supplies. The difficulty arises in determining $K_P$, since as mentioned above it is impractical to measure pressures directly, whereas indirect determination of the pressures can involve unacceptable time delays. Two methods will be disclosed for determining $K_P$. The first is a precise method strictly in accordance with theory. The second is an approximate method which has been found experimentally to yield an acceptable result. First, however, derivation of $K_T$ and $K_\alpha$ will be dealt with.

(i) Derivation of $K_T$

FIG. 3 shows the influence of different supply temperatures $T_H$, $T_C$ on the slope of the characteristic curve for a pressure ratio $\pi = 1$.

Differences in the supply temperature can arise, for example, according to the season, e.g. the domestic cold water supply may be at 5° C. during winter and 15° C. during summer. The control system should preferably take account of this. Looking at the graph of FIG. 3, it will be seen that the slope of the characteristic curve is proportional to the difference in the supply temperatures. The inverse-slope parameter $K_T$ can thus be expressed as follows:

$$K_T = \frac{A}{T_H - T_C} \tag{1}$$

where A is a constant of proportionality.

(ii) Derivation of $K_\alpha$

FIG. 4 shows the influence of the effective range of the setting angle $\alpha$ of the mixing valve or valves between cold and hot (minimum and maximum) water temperature settings, with the pressure ratio $\pi = 1$, and constant supply temperatures. Using individual valves for hot and cold water, the effective angular range is reduced whenever the valves are throttled so as to reduce the total flow rate. The effect of this is that a given change in angular setting of each valve has a larger effect on the mix temperature, the smaller the effective range. This is evident from FIG. 4, which shows the characteristic curve for the maximum effective range ($\alpha = 100\%$: maximum flow rate permitted) in comparison with that for reduced effective ranges of 50% and 25% in which the flow rate is confined e.g. to half or one quarter of the maximum. Hence the slope of the characteristic curve is inversely proportional to the relative total apertures of the valves. This is a differential or D-type behaviour. In the case of individual valves for the hot and cold water supplies, $\alpha$ represents the "total" valve setting $\alpha_H + \alpha_C$. The corresponding inverse-slope parameter $K\alpha$ is therefore expressed as:

$$K_\alpha = B(\alpha_H + \alpha_C) \ldots \quad (2)$$

(B = constant of proportionality).
(iii) Derivation of Kp
As mentioned above, the pressure ratio $$\pi = \frac{\Delta P_C}{\Delta P_H}$$

represents the ratio of pressure drops relating to the hot and cold supplies, e.g. pressure drops across individual valves used to control the hot and cold flow rates.

FIG. 2, based on fixed cold and hot water temperatures, shows the mixed water temperatures as functions of the mixing valve angle or angles for various pressure ratios $\pi$. Given the same pressure drop on the hot and cold water valves, the pressure ratio $\pi = 1$, and the curve obtained is a straight line. Curves convex downward are obtained for pressure ratios greater than 1, and curves convex upward for pressure ratios smaller than 1. At mean temperature $T_M = (T_C + T_H)/2$, consequently, both if $\pi > 1$ and if $\pi < 1$, increased slopes are obtained, and a corresponding reduction of the loop gain is called for.

Kp, giving the pressure effect on the loop gain, could in principle be determined using pressure sensors associated with the hot and cold water valves, but as mentioned above such sensors are too expensive to use in practice.

However, Kp can be derived indirectly by using the characteristic curve itself. Taking into account the three above-mentioned effects, we can express the mix temperature $T_M$ as follows:

$$T_M = f(\Delta P_H, \Delta P_C, T_H, T_C, \Delta_H, \Delta_C) \ldots \quad (3)$$

Therefore, by continually measuring or monitoring the parameters $T_H$, $T_C$, $\alpha_H$, $\Delta_C$ and the mix temperature $T_M$, by inserting all the values into the above relationship it should in principle be possible to obtain $\Delta P_H$, $\Delta P_C$. In fact, since the pressure effect on $T_M$ is dependent on the pressure ratio $\pi$, it is this ratio of pressure drops and not $\Delta P_H$ and $\Delta P_C$ individually which is obtainable; however, this is sufficient for deriving Kp which represents a compensatory response to the effect of $\pi$.

Of course, the function f, which relates the parameters to the resulting mix temperature, has to be known. This is obtained as follows.

The pressure drop across a valve having parameters Ro and Vo is:

$$\Delta p = R_o \cdot \dot{V}_o^2 \ldots \quad (4)$$

therefore $$\dot{V}_o = \sqrt{\frac{\Delta p}{R_o}} \quad (5)$$

(R = hydraulic resistance, V = flow rate, "o" suffix denotes fully-open valve).

If we denote full opening of the valve by $\alpha = 1$ and closure of the valve by $\alpha = 0$, then $$R = R_o \cdot \frac{1}{\alpha^2}, \quad (6)$$

and $$\dot{V} = \alpha \cdot \sqrt{\frac{\Delta p}{R_o}}$$

For the present purpose the relationship between $T_M$ and Kp is what matters and not the effects of changing the valve opening range or supply temperatures as such.

The effect upon $T_M$ of the valve opening settings can be eliminated by setting:

$$\alpha_C = 1 - \alpha_H \ldots \quad (7)$$

In this way the "total" valve opening $\alpha$ is normalised to 1, for individual hot and cold valves.

$$T_M = \frac{\dot{V}_H \cdot T_H + \dot{V}_C \cdot T_C}{\dot{V}_H + \dot{V}_C} \text{ and hence}$$

$$T_M = \frac{\alpha_H T_H \sqrt{\frac{\Delta P_H}{R_o}} + (1 - \alpha_H) \cdot T_C \cdot \sqrt{\frac{\Delta P_C}{R_o}}}{\alpha_H \cdot \sqrt{\frac{\Delta P_H}{R_o}} + (1 - \alpha_H) \sqrt{\frac{\Delta P_C}{R_o}}}$$

In the case of changes of the supply pressure, the pressure ratio $$\pi = \frac{\Delta P_C}{\Delta P_H}$$

comes into play. Assuming that the pressure changes consist of a factor $\sqrt{\pi}$ increase in the hot water pressure $P_H$ and a factor $$\frac{1}{\sqrt{\pi}}$$

decrease in cold water pressure $P_c$, then from equation (9):

$$T_M = \frac{\alpha_H \pi^{\frac{1}{4}} T_H + (1 - \alpha_H) \pi^{-\frac{1}{4}} T_C}{\alpha_H \pi^{\frac{1}{4}} + (1 - \alpha_H) \pi^{-\frac{1}{4}}} \quad (10)$$

-continued $$= \frac{\alpha_H \pi^{\frac{1}{2}} T_H + (1 - \alpha_H) T_C}{\alpha_H \pi^{\frac{1}{2}} + (1 - \alpha_H)}$$

$$= \frac{\alpha_H (\pi^{\frac{1}{2}} T_H - T_C) + T_C}{\alpha_H (\pi^{\frac{1}{2}} - 1) + 1}$$

The derivative of $T_M$ with respect to the valve opening setting $\alpha$ gives the slope of the characteristic curve.

$$T_M' = \left(\frac{u}{v}\right)' = \frac{u'v - v'u}{v^2}$$

where $u = \alpha_H(\pi^{\frac{1}{2}} T_H - T_C) + T_C$ $= \alpha_H \cdot \pi^{\frac{1}{2}} T_H - \alpha_H T_C + T_C$ so $u' = \pi^{\frac{1}{2}} T_H - T_C$ and $v = \alpha_H(\pi^{\frac{1}{2}} - 1) + 1$ $= \alpha_H \pi^{\frac{1}{2}} - \alpha_H + 1$ so $v' = \pi^{\frac{1}{2}} - 1$ whereby $u'v = \alpha_H \pi T_H - \alpha_H \pi^{\frac{1}{2}} T_H + \pi^{\frac{1}{2}} T_H - \alpha_H \pi^{\frac{1}{2}} T_C + \alpha_H T_C - T_C$ and $v'u = \alpha_H \pi T_H - \alpha_H \pi^{\frac{1}{2}} T_C + \pi^{\frac{1}{2}} T_C - \alpha_H \pi^{\frac{1}{2}} T_H + \alpha_H T_C - T_C$ Hence $u'v - v'u = \pi^{\frac{1}{2}} T_H - \pi^{\frac{1}{2}} T_C$ $= \pi^{\frac{1}{2}} (T_H - T_C)$ $v^2 = \alpha_H^2 \pi - \alpha_H^2 \pi^{\frac{1}{2}} + \alpha_H \pi^{\frac{1}{2}} -$ $\alpha_H^2 \pi^{\frac{1}{2}} + \alpha_H^2 - \alpha_H + \alpha_H \cdot \pi^{\frac{1}{2}} - \alpha_H + 1$ $= \alpha_H^2(\pi - 2\pi^{\frac{1}{2}} + 1) + \alpha_H(2\pi^{\frac{1}{2}} - 2) + 1$ Therefore $T'_M = \frac{\pi^{\frac{1}{2}}(T_H - T_C)}{\alpha_H^2(\pi - 2\pi^{\frac{1}{2}} + 1) + \alpha_H(2\pi^{\frac{1}{2}} - 2) + 1}$ (11)

The pressure effect parameter Kp is made proportional to the inverse of the slope of the characteristic curve in accordance with the present invention. Let $$Kp = \frac{T_H - T_C}{T'_M}$$

(or alternatively $$Kp = \frac{1}{T'_M}$$

with the effect of supply temperatures eliminated by making $T_H - T_C = 1$)
Then $$Kp = \alpha_H^2(\pi^{\frac{1}{2}} - 2 + \pi^{-\frac{1}{2}}) + \alpha_H(2 - 2\pi^{-\frac{1}{2}}) + \pi^{-\frac{1}{2}}) \ldots \quad (12)$$

From (9) with $\alpha_C$:

$$T_M = \frac{\alpha_H T_H \pi^{\frac{1}{2}} + \alpha_C T_C \pi^{-\frac{1}{2}}}{\alpha_H \pi^{\frac{1}{2}} + \alpha_C \pi^{-\frac{1}{2}}}$$ (13)

$$= \frac{\alpha_H T_H \pi^{\frac{1}{2}} + \alpha_C \cdot T_C}{\alpha_H \pi^{\frac{1}{2}} + \alpha_C}$$

$T_M(\alpha_H \pi^{\frac{1}{2}} + \alpha_C) = \alpha_H T_H \pi^{\frac{1}{2}} + \alpha_C T_C$ $\pi^{\frac{1}{2}}(T_M \alpha_H - T_H \alpha_H) = T_C \cdot \alpha_C - T_M \cdot \alpha_C$ so $\pi^{\frac{1}{2}} = \frac{\alpha_C(T_M - T_C)}{\alpha_H(T_H - T_M)}$ By substituting equation (13) in equation (12), there is thus obtained Kp in terms only of $\alpha_H$, $\alpha_C$, $T_H$ and $T_C$.

In practice, then, a fairly complex calculation using the current values of $\alpha_H$, $\alpha_C$, $T_H$ and $T_C$ is required at each time step in order to find the value of Kp, which is then combined with the more easily calculated $K_T$ and $K_\alpha$ (which restore the temperature and valve setting effects eliminated from the Kp calculation) to produce the instantaneous loop gain value $K_R$. The processing power required for these calculations is quite large, however, and it is desirable to obtain Kp by a simpler method.

The inventor of the present invention has discovered a much simpler empirical method of obtaining Kp based only on valve opening setting values. The value of Kp yielded by this method is only approximately inversely proportional to the slope of the characteristic ($T_M$, $\alpha$) curve but is good enough for practical operation.

In a practical embodiment of the invention, the control system controls the opening settings of individual valves for the hot and cold water supplies by mechanical actuators using stepping motors. The motors incorporate increment/decrement counters which keep track of the number of steps by which each motor shaft has been rotated overall in a given rotational sense, and these step counts represent the valve opening settings $\alpha_H$ and $\alpha_C$. If $S_H$ and $S_C$ are the step counts corresponding to $\alpha_H$ and $\alpha_C$, normalised "relative positions" of the two valves, independent of the total opening, can be defined as follows.

$$S_{RH} = \frac{S_H}{S_H + S_C} = \frac{\alpha_H}{\alpha_H + \alpha_C} \; ; \; S_{RC} = \frac{S_C}{S_H + S_C} = \frac{\alpha_C}{\alpha_H + \alpha_C}$$

Theoretical "relative positions" $S_{RHT}$ and $S_{RCT}$ can be defined for a hypothetical case in which the supply pressures $P_C$, $P_H$ are equal. Given in practice equal supply pressures and perfect stepping motors then $S_{RH}$ and $S_{RHT}$, and $S_{RC}$ and $S_{RCT}$, would be identical. Where pressure effects are present, on the other hand, the relationship between $S_{RH}$ and $S_{RHT}$ reflects the pressure effect on the characteristic curve, and a usable Kp value is given by:

$$Kp = C \cdot \frac{S_{RHT}}{S_{RH}}$$

where C is a constant of proportionality.

$S_{RHT}$ can be obtained from the corresponding theoretical valve opening setting $\alpha_{HT}$ in a relatively simple manner as follows.

From equation (9), when $P_C = P_H$:

$$T_M = \frac{\alpha_{HT} T_H + (1 - \alpha_{HT}) T_C}{\alpha_{HT} + (1 - \alpha_{HT})}$$

$= \alpha_{HT}(T_H - T_C) + T_C$

Hence $\alpha_{HT} = \frac{T_M - T_C}{T_H - T_C}$.

The Kp value obtained in this way varies slightly over-proportionally compared with the more precise value obtained using the first method, but this is desirable from the point of view of stable operation of the control system.

Indeed, when using the first method it may be found advantageous to obtain over-proportionality by using the value $Kp^2$ in place of Kp.

A further point is that it may not always be desirable to apply Kp, or for that matter $K_T$ or $K_\alpha$, literally to determine the loop gain. It may be preferable to optimise the control system to deal with normal, undemanding conditions with a "normal", relatively high loop gain value which would lead to instability under more extreme conditions. In this case only values of $K_R$ less than this "normal" value are of interest, and values of Kp (or for that matter $K_T$ or $K_\alpha$) leading to $K_R$ greater than the "normal" value are simply ignored.

Figure 5:
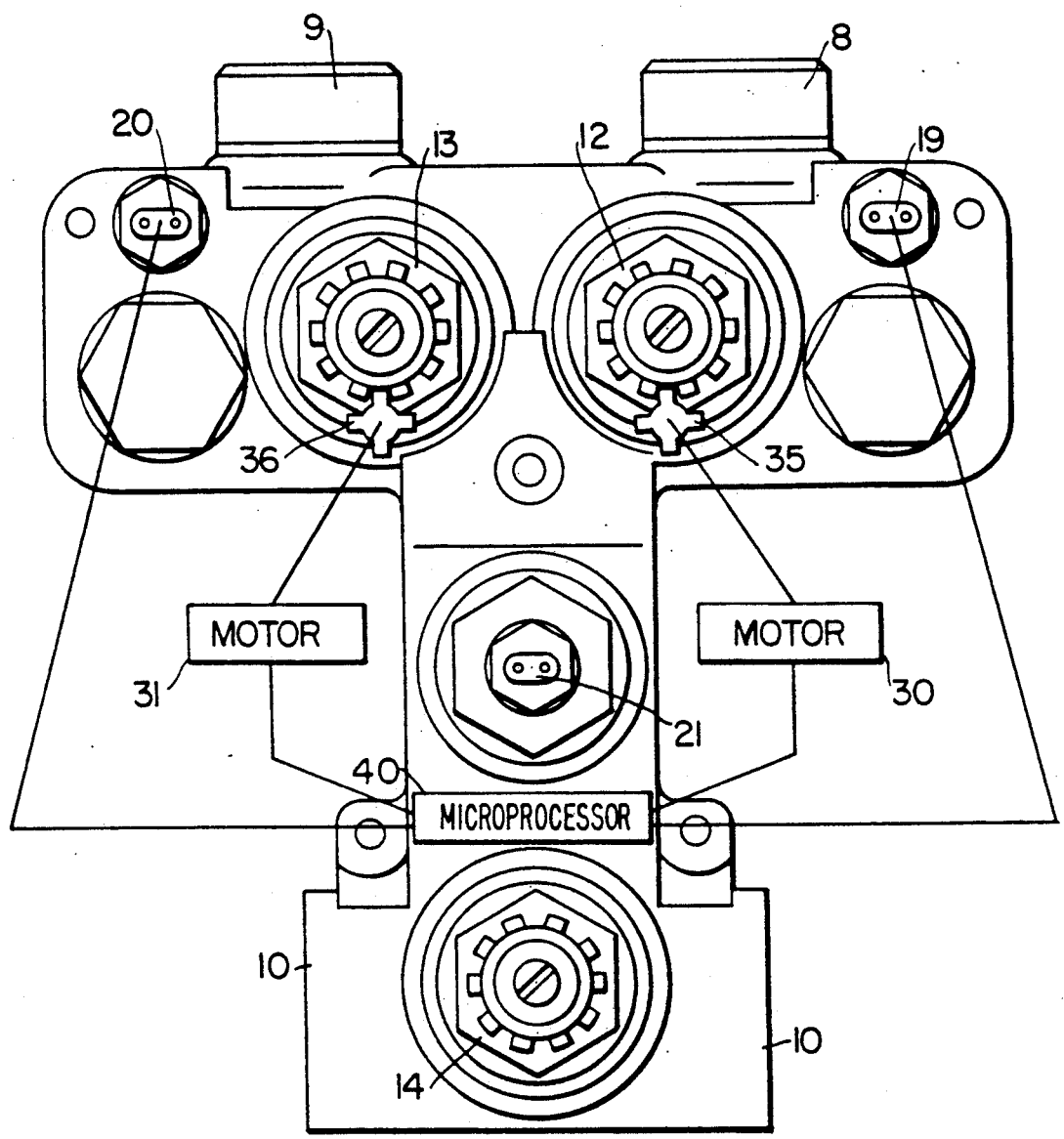
FIG. 5 illustrates a mixer fitting of a type which may be controlled by the control system of the present invention.

FIG. 5 shows an example of a mixer fitting to which the present invention may be applied. The mixer fitting includes a cold water inlet 9, a hot water inlet 8 and mixed water outlets 10 for supplying a bath and/or shower. Respective valves 12 and 13 are provided at the hot and cold water inlets, and a three-way valve 14 controls the mixed water. In addition, the inlets and a passage for the mixed water are each provided with temperature sensors 19, 20 and 21 for measuring $T_H$, $T_C$ and $T_M$, respectively. Motors 30, 31 and 32 drive the valves 12, 13 and 14, respectively. This is completed by means of reducing gears 35, 36 and 37 respectively. The valve opening settings are obtained by keeping track of rotations of the gears and/or motors. This is accomplished by the incorporation of increment/decrement counters into the motors to keep track of the number of steps by which each shaft has been rotated. The amount of gear rotation (valve opening setting) of each gear 35 and 36 is fed back to microprocessor 40, along with the temperature at each temperature sensor 19, 20 and 21. The microprocessor then compares $T_M$ with $T_{Target}$ and determines a difference, and this difference is converted into information causing motors 30 and 31 to adjust. This adjustment is proportional to $K_P$ which is approximately inversely proportional to the slope of the characteristic ($T_M$, $\alpha$) curve. This approximation is close enough for practical operation of the invention as hereinabove described. In turn gears 35 and 36 rotate in proportion to motors 30 and 31, thereby, adjusting valves 12 and 13 in proportion thereto.

It is claimed:

1. An electronic temperature control mixing valve unit for automatically maintaining the temperature of water at a predetermined temperature from a mix of hot and cold water sources having variable temperatures and pressures, said pressures defining a pressure ratio, comprising at least one valve means having an adjustable valve opening setting for adjusting relative flow amounts of said hot and cold water through the unit to give a desired mix water temperature, detecting means for detecting the temperature of said hot water, said cold water and said mix water and for determining said valve opening setting, said detecting means producing separate signals representative of said hot, cold and mix temperatures and said valve opening setting, calculating means receiving said separate signals and for directly calculating a loop gain in response thereto without first calculating the pressure ratio of said hot and cold water sources and control means for receiving said loop gain and for adjusting said valve opening setting in response to said loop gain.

2. A control unit as claimed in claim 1, wherein the effect of changes in supply pressure is taken into account in the calculated value of the loop gain by using said separate signals.

3. A control unit as claimed in claim 2, wherein said control means includes motor means for detecting said valve opening setting.

4. A control unit as claimed in claim 3, wherein said loop gain includes a factor Kp, said factor Kp in the loop gain being determined in response to the effect of changes in supply pressure without measuring said supply pressure, the supply pressure being obtained from the relation $$\frac{S_{RT}}{S_R},$$

where $S_R$ is a number of steps of the motor means corresponding to the valve opening setting and $S_{RT}$ is a theoretical equivalent of the same for equal supply pressures derived from the detected values of the hot and cold supply temperatures and the mix water temperature.

5. A control unit as claimed in claim 3, wherein said motor means controls said valve opening setting and defines an integral function that is proportional to the valve opening setting.

* * * * *